US006875263B1

(12) United States Patent
Pillai et al.

(10) Patent No.: US 6,875,263 B1
(45) Date of Patent: Apr. 5, 2005

(54) USE OF VEGETATIVE MATERIAL AS A FILLER IN COMPOSITE MATERIALS

(75) Inventors: Mailvaganam Thavalingam Sivasithambaram Pillai, Kuala Lumpur (MY); Khalid Haji Ahmad, Kuala Lumpur (MY); Arulgnanam Vettivaloo Arunasalam, Kuala Lumpur (MY)

(73) Assignees: Contract Research and Development, Kuala Lumpur (MY); David John Tadgell, Melbourne (AU)

( * ) Notice: Subject to any disclaimer, the term of this patent is extended or adjusted under 35 U.S.C. 154(b) by 0 days.

(21) Appl. No.: 09/889,610

(22) PCT Filed: Jan. 17, 2000

(86) PCT No.: PCT/AU00/00018

§ 371 (c)(1),
(2), (4) Date: Jan. 8, 2002

(87) PCT Pub. No.: WO00/42116

PCT Pub. Date: Jul. 20, 2000

(30) Foreign Application Priority Data

Jan. 18, 1999 (AU) .............................................. PP 8198

(51) Int. Cl.[7] .......................... C04B 16/02; C08L 97/02; C08K 3/36
(52) U.S. Cl. ....................... 106/406; 106/407; 106/717; 106/731; 106/737; 524/15; 524/492; 524/493; 252/609; 264/29.1; 264/29.4; 264/29.6; 264/29.7
(58) Field of Search ................................ 106/406, 407, 106/717, 737, 731; 252/609; 523/521; 524/15, 492, 493; 264/29.1, 29.4, 29.6, 29.7

(56) References Cited

U.S. PATENT DOCUMENTS 3,830,903 A * 8/1974 Robinsky et al. ......... 423/449.2
3,951,907 A   4/1976 Mehta ..................... 260/42.46
3,959,007 A * 5/1976 Pitt ............................ 106/406
3,988,270 A  10/1976 Willis, Jr. et al. ......... 260/17.4
4,105,459 A   8/1978 Mehta ......................... 106/98
4,202,803 A   5/1980 Signoretto ................ 260/17.4
4,496,674 A   1/1985 Ehrhart et al. ............. 523/500
4,829,107 A * 5/1989 Kindt et al. .................... 524/3
5,916,499 A * 6/1999 Murayama et al. ........ 264/29.1

FOREIGN PATENT DOCUMENTS

| GB | 955049 A | 4/1964 | |
|---|---|---|---|
| GB | 2 084 212 A | 4/1982 | ............. E04C/2/10 |
| WO | WO 92/00251 | 1/1992 | ............. C04B/7/02 |
| WO | WO 95/21550 | 8/1995 | ........... A43B/13/04 |

OTHER PUBLICATIONS

International Search Report from International Patent Application PCT/AU 00/00018, filed Jan. 17, 2000.
Australian Patent Abstract, AU–A–68923/94, Jul. 13, 1995, Pagden.
Australian Patent Abstract, AU–A–60599/94, Nov. 2, 1995, National Research Development Corporation.
Australian Patent Abstract, AU–A–34510/95, Feb. 1, 1996, Pagden.
SU 956502 A, Melkumov, Sep. 7, 1982, Derwent Abstract 83–715109.
BE 1000901 A, De Neef, May 9, 1989, Derwent Abstract 89–145267.

* cited by examiner

*Primary Examiner*—Joseph D. Anthony
(74) *Attorney, Agent, or Firm*—Wolf, Greenfield & Sacks, P.C.

(57) ABSTRACT

This invention relates to the use of a filler derived from cereal husk, more particularly rice husk, in composite materials to enhance the flame retardant, antistatic, accelerator, plasticiser and blowing characteristics in various composite materials.

3 Claims, No Drawings

USE OF VEGETATIVE MATERIAL AS A FILLER IN COMPOSITE MATERIALS

This application is a continuation of application no. PCT/AU00/00018, filed on Jan. 17, 2000 which claims priority to AU PP 8198 filed Jan. 18, 1999, both of which are hereby incorporated by reference in their entirety.

TECHNICAL FIELD

1. Field of the Invention

This invention relates to the use of a filler derived from cereal husk, more particularly rice husk, in composite materials to enhance the flame retardant, antistatic, accelerator, plasticiser and blowing characteristics in various composite materials. The invention has particular but not exclusive application to the following families of composites:

1. Thermoplastic Resins
2. Thermoset Plastics
3. Rubbers and Elastomeric Materials
4. Conductive Coatings and Printing Inks
5. Bitumen
6. Concrete

BACKGROUND ART

2. Background of the Invention

Composite materials are well known. Fillers are usually added to composite materials, including composite polymers, to save cost or to enhance a particular mechanical property or other characteristic of the materials. The usage of fillers is usually accompanied by coupling agents that enhance the polymer-filter and filler-filler interaction so that the expected properties are realised.

The present invention is concerned with fillers which enhance the anti-static, flame retardant, accelerator, plasticiser, blowing characteristic and/or other physical or mechanical properties of composite materials and has particular application for use in composite polymers. Such have wide application in the aeronautical, mining, computer, road building, textile, foot ware, rubber and polyurethane industries among others. For example, it is often desirable to prevent the build up of static charges which can cause sparks (and hence explosions or electrical damage) or production problems, eg. collection of dust and poor feeding of materials through machinery. More highly conductive composite polymers can also be used for Electro Magnetic Interference shielding, for example.

Carbon black fillers, aluminium flakes and fibres, stainless steel fibres and chopped carbon fibres have all been used as fillers for the purpose of rendering composite plastic conductive. Likewise other chemicals such as Halogen compounds or triethyl phosphate have been used to achieve the flame retardant property.

A number of theories have been proposed to explain how discreet particle fillers impart conductivity and flame retardant properties in composite plastics.

In order for current to flow in a conductive polymer compound, electrons must travel along the filler as the plastic itself is an excellent insulator. To achieve this flow the discreet particles of the filler must be in contact or separate by a minimum distance which is probably less than 100 Angstroms. There are three properties of the filler particles which will effect the average inter-particle distance for a given filler loading in a polymer system. These are particle size, shape (structure), and porosity. Smaller size, irregular shape and high porosity all result in smaller inter-particle distances and hence higher conductivity. A fourth property of the particle which is relevant to conductivity and flame retardant properties in the composite plastics is surface chemistry, that is the presence of oxygen on the surface. The presence of appreciable quantities of oxygen on the surface (called volatile content) acts as insulation and hence reduces conductivity.

The known conductive fillers such as carbon black, aluminium, stainless steel and carbon fibres are expensive and furthermore some of these materials have other processing difficulties, eg. aluminium fibres and stainless steel fibres settle in liquid environments due to their high density. Further problems with known conductive fillers are that they often compromise other properties of composite plastics such as flame retardance and strength.

Static electrification of articles can lead to a number of undesirable effects including:

Attraction of dust particles.

Attraction between surfaces, e.g. plastic films and textile yams.

Risk of fire or explosion caused by sparking near inflammable liquids, gases, and explosive dusts, e.g. coal dust and flour.

Risk of shock to persons handling equipment.

The accumulation of electrostatic charges can be prevented by using materials of low resistance. The resistivity of natural rubber can be lowered by compounding with suitable ingredients. Alternatively, as static electrification is a surface phenomenon, the product can be covered with a conducting surface layer.

Low resistance rubber is required for a wide range of applications, such as rollers for textile machinery, conveyor belting, fuel hoses, flooring, footwear, antistatic gloves (electronic industry), cables, equipment used in hospital operating theatres, and aircraft components.

The terms "antistatic" and "conductive" are restricted here to rubber products rather than the rubber itself because the electrical resistance of the product depends not only on the resistivity of the rubber but also on the shape and most probable positions of charge generation and discharge.

Natural rubber is normally considered to be an electrically insulating material but it can be an electrically insulating material but it can be compounded to give electrical resistivity lying anywhere between 1 ohm/cm. and $10^{15}$ ohm/cm. The most common means of reducing resistance is to add a suitable carbon black (super conductive furnace). Resistance falls with a decrease in particle size, increase in black "structure" and increase in concentration. For light coloured products certain grades of aluminium silicate may be used as antistatic fillers although these are usually less effective in reducing resistance than the super conductive furnace. There are also other proprietary antistatic agents that are available, such as ethylene oxide, but still these agents are less effective then the super conductive furnace.

The applicant has found that carbonised rice husk is particularly suited for use as a filler in plastics as it has been found to enhance the conductivity and flame retardant properties of the composite plastics.

Honeycomb structure of a matrix is supposed to be one of the strongest structures that have been determined by Structural Engineers. The strength comes about from the full depth hexagons and half-depth trapezoids. This type of structures is presently used as designs for building bridge decks.

The rice husk has a similar type of honeycomb design, which results in not only providing strength to the matrix, but also has sound and thermal insulation properties. The Sound insulation property is provided by the micro-cellular structures formed by the honeycomb structure in the brown rice husk. Thus the sound is trapped within the microcellular structure. This property is inherent to the brown (fresh) rice husk. The Thermal insulation property is provided by the honeycomb structure, which is strengthened by the silica and fibre which predominately present in brown rice husk and lesser in the carbonised (depend to the rate of carbonising) rice husk.

The presence of appreciable quantities of oxygen on the surface of carbonised rice husk acts as insulation for each aggregate, thereby reducing the conductivity and also reducing the flammability. The presence of nitrogen and oxygen in the fresh husk not only enables the blowing effect but also nitrogen being inert reduces the flame spread. The volume of gas (nitrogen/oxygen) evolution per gram of fresh rice husk is 240 ml/g. The husk's decomposition temperature is at about 280° C. and curing temperature of rubber and ethyl vinyl acetate is between 130° C.–180° C., thus when urea (dinitroso pentamethylene tetramine) is milled along the decomposition temperature is reduced within the curing temperatures. The presence of silica in the rice husk provides better mechanical strength.

Typical chemical and physical properties of fresh and carbonised rice husk are detailed as follows:

consists of 20–23% of paddy husk burning: 20% ash by weight 90–95% is silica (amorphous and crystalline)

physical characteristics: bulk density 96.12–112.14 kg/m$^3$ pH 7.14 (husk ash)

moisture content 5.6–7.2%, dry basis ash 22.2%

| Chemical Composition | | |
|---|---|---|
| Moisture Content | 5.6–7.2%, dry basis | |
| Ash: | 22.2% | |
| Protein | 2.4% | |
| Crude fat | 0.7% | |
| Carbohydrate | 32.0% | |
| | Fresh RH | Carbonised RH |
| $Al_2O_3$ | 0.025% | 0.023% |
| CaO | 0.36% | 0.12% |
| NaO | 0.034% | 0.018% |
| $SiO_2$ | 96.2% | 53.88% |
| $Fe_2O_3$ | 0.041% | 0.022% |
| MgO | 0.16% | 0.078% |
| $K_2O$ | 0.69% | 0.95% |
| $P_2O_5$ | 0.57% | 0.27% |

It is an object according to one aspect of the present invention to provide an alternative filler which will enhance the antistatic, flame retardant, accelerator, plasticiser blowing and/or other physical or mechanical in composite materials. The filler is desirably cheap, environmentally friendly and replenishable and it does not compromise other characteristics of the composite material.

SUMMARY OF INVENTION

The present invention in one aspect resides in the use of carbonised vegetative-based filler to provide improved antistatic, flame retardant, accelerator, plasticiser, blowing and/or other physical or mechanical characteristics in composite materials.

Preferably, the carbonised vegetative-based filler is carbonised rice husk.

Preferably, the carbonised rice husk is burnt at about 800° C. for about 4 seconds. Most preferably, the carbonised rice husk is burnt at 803–804° C. for 3–4 seconds.

In another aspect the invention resides in a composite material, more particularly a composite plastic including a vegetative-based filler when used as a conductive or flame retardant article.

Preferably, the carbonised vegetative-based filler is carbonised rice husk which has been burnt at 803–804° C. for 3–4 seconds.

The present invention also exhibits the usage of fresh and carbonised rice husk as a blowing agent when used in combination with recycled (reclaimed), or virgin natural rubber or other suitable thermoplastic materials. Though other conventional blowing agents have been used with natural or synthetic rubber to achieve the similar products but so far no blowing agents have been used with recycle (reclaim) rubber to produce similar products. Furthermore the conventional blowing agents are expensive and dosages are higher as compared to the fresh rice husk. For example for the conventional blowing agent, the dosage is about 6.5–7 phr, whereas the fresh/carbonised rice husk, the dosage is between 1.5 to 3 phr. When rice husk is used at different dosages the blowing effect is different. It was also noted that the rice husk does not only work as a blowing agent, but also as a plasticizer and a filler. The properties achieved are comparable to conventional blowing agents, when using fresh or carbonised rice, has no difference to the conventional blowing agent other than the colour of the end product.

Ebonite, a hard, dark-coloured plastic-like material, is the reaction product of rubber and a large proportion of sulphur. Simple rubber/sulphur mixtures are seldom used in practice; they suffer from poor processability, require long cure times and lead to excessive shrinkage and heat evolution during cure. Accelerators, fillers, processing aids and other compounding ingredients are widely used in ebonite, as in soft rubber vulcanised rubber, to ease processing, shorten cure times and modify properties. The curing times for ebonite are generally up to ten (10) hours at 150° C., thus making ebonite products expensive. Ebonite can be made from synthetic, such as BR, NBR, SBR and Nitrile rubber and as well as from Natural rubber. High strength, low thermal conductivity, chemical resistance and insulating properties of natural rubber make it a popular choice. Although it has been superseded in many applications by synthetic thermoplastic and thermosets, it is still used for outstanding chemical resistance and electrical properties coupled with high mechanical strength and ease of machining.

The present invention exhibits the usage of fresh and carbonised rice as an accelerator when used in combination with recycled (devulcanised) or virgin natural rubber, and at the same time making ebonite a conductive product when carbonised rice husk is used. Though other conventional accelerators have been used with natural or synthetic rubber (virgin or recycled) to achieve the similar products but so far no accelerators like the rice husk material have been used with recycled (devulcanised) rubber to produce similar products. Further more the conventional accelerators and conductive carbon black are expensive and difficult to blend and process. When rice husk is used singularly at different dosages the activation effect is different to meet industrial requirements. Generally for ebonite production the sulphur content should be in the range of 25–40 phr, but whereas when fresh rice husk between 25–30 phr is used the sulphur content could be reduced to 20–25 phr. Accelerators are less effective in ebonite than in soft rubber and large quantities are generally required. Basic accelerators such as guanidines and aldehyde-amines are preferred. Inorganic activators such as magnesium oxide, magnesium carbonate and lime are also effective when used with organic accelerators to reduce cure time without the risk of over heating.

Common inorganic fillers used in ebonite are china clay, talc, silica, whiting and magnesium oxide. These also reduce shrinkage and heat evolution but loaded ebonite generally have weaker mechanical properties than unloaded ones. Carbon black does not reinforce ebonite and is normally only added for pigmentation, although conductive carbon black are sometimes used to prepare electrically conducting ebonite.

BEST MODE

Following is an example of the invention, in this example the filler is carbonised rice husk (CRH) which has been burnt at 803–804° C. for 3–4 seconds. After this the CRH is obtained.

The manner in which the rice husk is burnt is believed to be important in achieving the desired surface area, surface structure and porosity necessary for conductivity and flame retardant and blowing properties in the composite plastics to be achieved. At this stage the range of temperature and the duration of the time of burning which achieves the desired result has not been fully explored, however it is predicted that the temperature range will be from about 100–950° C. and the time range will be from about 2–30 seconds, although these ranges may be much narrower. The importance of controlled burning in a prescribed time results in obtaining better surface area and porosity which in turn offers ideal properties emitting anti-static, flame retardant and enhancing physical properties of the material. In the absence of controlled burning, the surface area, surface structure and porosity would be distorted. While the present exemplification involves use of carbonised rice husk it is possible that the desired results may be achieved by use of other carbonised vegetative-based fillers.

EXAMPLE 1

A thermoset application called pulforming was used to manufacture fibre reinforced bolts. Fibre glass tows (36 tow of 8000 tex) are pulled into a resin bath that contains:

1. Polyester and Vinyl Ester combination, ie. 60% Vinyl Ester (Derakane 411—Dow Chemical) and 40% Polyester (Everpol 3260 AR—P.T. Arinde).
2. Zinc Stearate (mould releasing agent)—1.18% of the resin weight BYK 980 (improves wetting and dispersing of fillers in glass fibre reinforcement compounds)—1.5% of the filler weight.
3. BYK 515 (air releasing agent)—0.5% of the total weight of the resin mixture.
4. BYK 996 (wetting and dispersing additive for mineral fillers in hot curing, glass fibre reinforced UP-resin systems)—2% of the resin weight.
5. Fillers ($Ca_2(CO)_3$ & Carbonised Rice Husk (mesh size 325) @ 55% & 12% of the resin weight).
6. Aluminium Trihydrate (2.4% of the resin weight).
7. Catalyst TBPH (Tertiary Butyl Peroxy-2-Ethyl Hexanoate)—2.12% of the resin weight.
   TBPB (Tertiary Butyl Perbenzoate)—0.53% of the resin weight.

The wet fibre glass tow is pulled into the mould and compressed at a pressure of 800 psi (5600 kPa) for 3.8 minutes at 130° C. Then the bolt is pulled out of the mould and left to cure.

The following day tests were carried out on the bolt with the following results:

Tensile strength at the thread—50 kN
Torque—45 ft/lb
Bond strength—BS 1610: Part 1, Grade 1.0
Fire rating—BS 5865:1980—Persistence flame shall be less than 10 seconds
Electrical conductivity—less than 10 to the power of 9 Ohms.

EXAMPLE 2

All chemicals used are taken by percentage of weight of rubber. The rubber and the chemicals are mixed in a Banbury, for 5 minutes. Recycled rubber (reclaim) (220 g) is first milled with zinc oxide (4.5%)—accelerator, which is followed with stearic acid (1.8%)—activator, Mercadibenzothiazole disulphide (MBTS)(0.5%), Tetramethylthiuram disulphide (TMTD)(0.2%)—accelerator, fresh rice husk (27%)—blowing agent and filler and sulphur (2.7%)—vulcanisate. Then the mixed compound is milled for five (5) minutes to form a sheet that is ready for curing. Then a piece of the sheet weighing about 32 g is placed in a mould that it is to be cured for two (2) minutes in a oven at 150° C. temperature. The conventional curing time is six (6) minutes at the same temperature of 150° C.

The rubber and the chemicals are mixed in a Banbury, for 5 minutes. The similar approach has been done for using SBR Rubber (100 g), silica (62 g), Peg 1500 (2.5 g), Paraffin oil (5 g), Zinc oxide (2.5 g), Wing stay (0.5 g), Wax (1 g), Mercadibenzothiazole disulphide (MBTS) (1.5 g), Tetramethylthiuram disulphide (TMTD) (0.2 g), Stearic acid (1.5 g) and Sulphur (2 g). The milling was done for ten (10) minutes and later cured in the oven for six (6) minutes at 150° C.

This exercise was repeated by using fifty (50) percent of the virgin material compound and fifty (50) percent recycled (reclaimed) material compound, and cured in the oven at 150° C. for two (2) minutes.

With the level, of rice husk dosage, the blowing effect can be controlled to suit the industry's requirement.

Machine Operating Conditions
Virgin Rubber:

| PROPERTIES | SMR-10 | TYRE DUST | TYRE DUST WITH BROWN RICE HUSK | EXAMPLE 1 WITH BROWN RICE HUSK | EXAMPLE 1 WITHOUT BROWN RICE HUSK |
|---|---|---|---|---|---|
| Mooney Viscosity MLI + 3, 100° C. Monsanto Rheometer, 150° C. | 60 | 36.6 | 31.8 | 24 | 30 |
| Scorch time | 1.4 | 3.8 | 1.2 | 2 | 2.5 |
| Cure time | 7.4 | 3.5 | 3.25 | 4 | 4 |

By using nice husk the Mooney viscosity was lower than the conventional filler, thus lowering scotch time (time taken by the rubber compound to flow into the mould) and curing time (time taken to cure rubber compound) respectively. As such this leads to a cheaper production system. Presently various fillers and blowing agents are being used in the production of soft/spongy rubber that would produce different types of cell structures for an end product, but the cost determines the market.

EXAMPLE 3

All chemicals used are taken by percentage of weight of rubber. The rubber and the chemicals are mixed in a Banbury, for six (6) minutes. The recycle (devulcanised) rubber is first milled with magnesium oxide (2%)—accelerator, which is followed with Diphenylguanidine (2%)—accelerator, fresh rice husk (30%)—accelerator and filler and sulphur (30%)—vulcanisate. After the milling at the Banbury for ten (10) minutes, it is then milled into a sheet. The mould was heated in the oven press to 150° C. then the sheeted rubber is placed in the mould and it is cured for twelve (12) minutes. The conventional curing time is between eight to ten hours at the same temperature of 150° C.

A conventional formula for ebonite was selected to compare. The rubber and the chemicals are mixed in a Banbury, for 5 minutes. The similar mixing as above was followed, using SBR 5 Rubber (100 g), ebonite dust (100 g), China clay (50 g), Magnesium oxide (5 g), Diphenylguanidine (3 g), Linseed oil (5 g) and Sulphur (45 g). The milling was done for ten (10) minutes and later cured in the oven for eight (8) hours at 150° C.

Mix properties; Rice Husk filled mix

| | |
|---|---|
| Mooney viscosity, MLI + 3, 100° C. | 24 |
| Mooney viscosity, MLI + 3, 120° C. | 18.5 |
| Mooney scorch, $t_s$, MLI + 3, 120° C. min. | 5.8 |
| Monsanto Rheometer, 160° C. time to 95% cross-linking, s | 110 |

By using rice husk the curing time is reduced tremendously twelve minutes as compared to eight to ten hours. The sulphur content in the rubber polymer is reduced by fifteen percent.

The results are based on cure time, the formulation with rice husk cures faster than the formulation without rice husk, i.e. twelve minutes for with brown rice husk and about eight hour without rice husk.

EXAMPLE 4

All chemicals used are taken by percentage of weight of natural rubber (NR). The natural rubber and the chemicals are mixed in an open mill or kinder, for six (6) minutes. Natural rubber is first milled with stearic acid (1%) and zinc oxide (5%) activator, which is followed with rice husk (blowing agent) (2.5–3.5%), calcium carbonate—(40%), promoter—urea based (2.5–3.5%), silica (10%), accelerator dibenzthiazyldisulphide (MBTS) (0.05%) and catalyst sulphur (1.5%). After the milling at the open mill or kinder for ten (10) minutes, it is then milled into a sheet. The mould was heated in the oven press to 160° C. then the sheeted natural rubber is placed in the mould and it is cured for twenty-two (22) minutes.

The temperature for curing could be from 145°–160° C. and the cure time may differ according to the mould size.

Cured properties; rice husk filled blowed mix—microcellular cells

| 1. Hardness | Askar C | 35 |
|---|---|---|
| 2. Shrinkage | % | 5 |
| 3. Specific Gravity | g/cc | 0.3–0.35 |

By using rice husk as a blowing agent the catalyst percentage could be reduced and as well as the percentage of blowing agent used.

EXAMPLE 5

Thermoplastic (EVA)

All chemicals used are taken by percentage of weight of thermoplastic—Ethyl Vinyl Acetate (EVA). The EVA and the chemicals are mixed in an Open Mill or Knider, for six (6) minutes. Ethyl Vinyl Acetate (EVA) is first milled with Stearic Acid (1%) and zinc oxide (5%) accelerator, which is followed with Rice Husk (Blowing agent) (2.5%). Magnesium carbonate—(10%), Promoter—urea based (5%) and catalyst Diacyl Peroxide (1%). After the milling at the Open mill or Knider for ten (10) minutes, it is then milled into a sheet. The mould was heated in the oven press to 160° C. then the sheeted EVA is placed in the mould and it is cured for twenty-two (22) minutes.

The temperature for curing could be from 145°–160° C. and the cure time may differ according to the mould size.

Cured properties: Rice Husk filled blowed mix—microcellular cells

| 1. HARDNESS | Askar C | 29–35 |
|---|---|---|
| 2. SHRINKAGE | % | 2 |
| 3. SPECIFIC GRAVITY | g/cc | 0.200 |
| 4. COMPRESSION SET | % | 80 |

By using rice husk as a blowing agent the catalyst percentage could be reduced and as well as the percentage of blowing agent used.

EXAMPLE 6

The rice husk is mixed by weight with tyre crumbs(35–40 mesh) and an effluent from the palm oil mill called Scavenger (which have a fatty acid content ($C_8$–$C_{18}$). From literature it has been reported that by using tyre crumb with the binder (bitumen) there is an improve of properties for the asphalt mixture. This invention not only uses tyre crumb along with rice husk and an oil palm effluent to further improve the properties. As well as the formulation address the recyclability of all agro waste by-products to be used in the road surfacing industries. The formulation of the rice husk mixture as follows:

| | |
|---|---|
| Rice husk | 50% |
| Tyre crumb | 45% |
| Scavenger | 5% |

In this particular example the usage of rice husk mixture is divided into two categories:

A. RICE HUSK MIXTURE USED IN MODIFIED BINDER

B. RICE HUSK MIXTURE USED IN AS FILLER

A. The rice husk mixture is added to the bitumen first in compliance to the SOCIETY OF HIGHWAY PROCEDURE (SHRP) to manufacture modified bitumen. The bitumen is first heated to about 160° C., then the rice husk mixture twenty percent 20% by weight of bitumen is mixed with the heated bitumen for about one hour. As a result of this reaction a modified bitumen is made. From here 5–7% by weight of this modified bitumen is added to the aggregate. The aggregate is first heated to about 200° C. and the modified bitumen is mixed for three to four minutes. The modified bitumen with rice husk mixture complies to all requirement of the SHRP.

B. The rice husk mixture is added as a filler to the aggregate, by four (4%) by weight to the aggregate weight. The aggregate is first heated to 200° C., and is allowed to cool to about 160° C., then the rice husk mixture is added and mixed and lastly the bitumen 5–6% by weight of aggregate is added and mixed for 3–4 minutes. This blending with rice husk mixture complies to all requirement of the Marshall Properties.

TABLE 1

PROPERTIES OF RICE HUSK MODIFIED BINDER - SHRP

| SHRP | 80/100 | RICE HUSK MIXTURE |
|---|---|---|
| FLASH POINT TEMP. ° C. | 230 | 240 |
| SOFTENING POINT, ° C. | 44–50 | 55–70 |
| PENETRATION @ ° C. 25, dmm | 80–100 | 60–100 |
| BROOKFIELD VISCOSITY @ 135° C., MPaS | <500 | >1500 |
| DYNAMIC SHEAR RHEOMETER | | |
| PG 70 | | |
| ORIGINAL | | |
| G* (Pa) | <1000 | >1200 |
| δ (°) | >80 | >80 |
| G*/Sin δ | <1000 | >1200 |
| AFTER RTFOT | | |
| G* (Pa) | <1000 | >3800 |
| δ (°) | >80 | >70 |
| G*/Sin δ | <1000 | >3800 |
| AFTER PAV | | |
| G* (Pa) | <1000 | >230 |
| δ (°) | >80 | >50 |
| G*/Sin δ | <1000 | >260 |
| PG 76 | | |
| ORIGINAL | | |
| G* (Pa) | <1000 | >1800 |
| δ (°) | >80 | >70 |
| G*/Sin δ | <1000 | >1800 |
| AFTER RTFOT | | |
| G* (Pa) | <1000 | >2400 |
| δ (°) | >80 | >70 |

TABLE 1-continued

PROPERTIES OF RICE HUSK MODIFIED BINDER - SHRP

| SHRP | 80/100 | RICE HUSK MIXTURE |
|---|---|---|
| G*/Sin δ | <1000 | >2600 |
| AFTER PAV | | |
| G* (Pa) | <1000 | >230 |
| δ (°) | >80 | >50 |
| G*/Sin δ | <1000 | >280 |

TABLE 2

MIXED PROPERTIES OF RICE HUSK MODIFIED BINDER

| PROPERTIES | 80/100 | RICE HUSK MIXTURE |
|---|---|---|
| MARSHALL STABILITY (kN) | 5–10 | >13 |
| FLOW (mm) | 2–4 | 2–4 |
| QUOTIENT (kN/mm) | 1–3.5 | 3–4 |
| RESILIENT MODULUS @ 25° | >2000 | >2800 |

TABLE 3

MIXED PROPERTIES OF RICE HUSK MIXTURE AS FILLER

| PROPERTIES | 80/100 | RICE HUSK MIXTURE |
|---|---|---|
| MARSHALL STABILITY (kN) | 6–10 | >12 |
| FLOW (mm) | 2–4 | 2–4 |
| QUOTIENT (kN/mm) | 1–3.5 | 3–4 |
| RESILIENT MODULUS @ 25° | >2000 | >2800 |

TABLE 4

PREFERRED PARTICLE SIZE AND DOSAGE OF FRESH AND/OR CARBONISED RICE HUSK FOR PARTICULAR COMPOSITE MATERIALS

| COMPOSITE MATERIAL | FRESH/DOSAGE | CARBONISED/DOSAGE |
|---|---|---|
| BITUMEN (MECHANICAL PROPERTY) | 100 MESH - 40–60 phr | — |
| THERMOPLASTIC (EVA) BLOWING CHARACTER | 325–400 MESH - 1.5–2.5 phr | 325–400 MESH - 1.5–2.6 phr |
| THERMOPLASTIC (EVA) MECHANICAL PROPERTY | 325–400 MESH - 1.5–5 phr | 325–400 MESH - 1.5–2.5 phr |
| RUBBER (N.R./S.R.) BLOWING CHARACTER | 325–400 MESH - 1.5–27 phr | 325–400 MESH - 1.5–27 phr |
| EBONITE N.R. (REDUCE CURE TIME) | 100–200 MESH 18–30 phr | — |
| RUBBER (N.R./S.R.) SCOTCH TIME | 100–200 MESH 5–10 phr | 100–200 MESH 5–10 phr |
| THERMOSET RESIN (FLAME PROPERTY) | — | 325 MESH 10–15 phr |
| THERMOSET RESIN (MECHANICAL PROPERTY) | 100–200 MESH 10–15 phr | 100–200 MESH 10–15 phr |
| THERMOSET RESIN (ANTISTATIC) | — | 325 MESH 10–15 phr |
| RUBBER-LATEX (N.R./S.R.) ANTISTATIC | — | 325–400 MESH 5–15 phr |
| RUBBER (N.R./S.R.) | — | 325–400 MESH 5–15 phr |

TABLE 4-continued

PREFERRED PARTICLE SIZE AND DOSAGE OF FRESH AND/OR
CARBONISED RICE HUSK FOR PARTICULAR COMPOSITE MATERIALS

| COMPOSITE MATERIAL | FRESH/DOSAGE | CARBONISED/DOSAGE |
|---|---|---|
| ANTISTATIC CONCRETE (MECHANICAL PROPERTY) | 100–200 MESH 10–15 phr | 100–200 MESH 10–15 phr |

N.R. - NATURAL RUBBER
S.R. - SYNTHETIC RUBBER

It will of course be realised that whilst the above has been given by way of illustrative examples of this invention, all such and other modifications and variations hereto, as would be apparent to persons skilled in the art, are deemed to fall within the broad scope and ambit of this invention as herein set forth. For instance, while the preceding examples relate to the use of fresh and/or carbonised rice husk it would be apparent to a person skilled in the art that other cereal husks such as sorghum husk may be suitable.

Throughout the description and claims of the specification where reference is made to the dosage of fresh and/or carbonised rice husk, this dosage is expressed in terms of "phr" (parts per hundred) based on the weight of the composite material into which the rice husk is being introduced.

Throughout the description and claims of the specification the word "comprise" and variations of the word, such as "comprising" and "comprises", is not intended to exclude other additives, components, integers or steps.

What is claimed is:

1. A process for the production of a carbonised vegetative-based filler wherein said process comprises burning a fresh vegetative-based material at about 803° to 804° C. for 3 to 4 seconds.

2. A process according to claim 1 wherein the fresh vegetative material is ground to a particle size of from 100 mesh to 400 mesh.

3. A process according to claim 1 or claim 2 wherein said process utilises fresh rice husk as the vegetative material.

* * * * *

UNITED STATES PATENT AND TRADEMARK OFFICE
CERTIFICATE OF CORRECTION

PATENT NO. : 6,875,263 B1
DATED : April 5, 2005
INVENTOR(S) : Mailvaganam T.S.P.M Pillai et al.

It is certified that error appears in the above-identified patent and that said Letters Patent is hereby corrected as shown below:

Title page,
Item [75], Inventor, change "Mailvaganam Thavalingam Sivasithambaram Pillai" to
-- Mailvaganam Thavalingam Sivasithambaram Pillai Mailvaganam Pillai --

Column 1,
Line 33, under "BACKGROUND ART" change "polymer-filter" to -- polymer-filler --

Column 2,
Line 18, change "yams" to -- yarns --

Column 6,
Line 59, under EXAMPLE 2, change "nice" to -- rice --

Signed and Sealed this

Fifth Day of July, 2005

JON W. DUDAS
*Director of the United States Patent and Trademark Office*